United States Patent [19]

Nishina et al.

[11] Patent Number: 4,604,454
[45] Date of Patent: Aug. 5, 1986

[54] METHOD OF RECOVERING VINYL CHLORIDE RESIN

[75] Inventors: Masaaki Nishina, Takaoka; Shiro Imaizumi, Yokohama; Osamu Ozaki, Himi, all of Japan

[73] Assignee: Nippon Zeon Co., Ltd., Tokyo, Japan

[21] Appl. No.: 665,118

[22] Filed: Oct. 26, 1984

[30] Foreign Application Priority Data

Oct. 28, 1983 [JP] Japan ................ 58-202025

[51] Int. Cl.$^4$ .......................... C08F 6/24; B07B 1/04
[52] U.S. Cl. .................................. 528/491; 528/494; 528/497; 528/498; 528/502; 524/569; 209/17
[58] Field of Search ................ 528/491, 499, 502; 526/344.3; 209/2, 17; 524/569

[56] References Cited

U.S. PATENT DOCUMENTS

| | | | |
|---|---|---|---|
| 2,514,191 | 7/1950 | Rowland et al. | 528/499 X |
| 2,550,996 | 5/1951 | Halbig | 528/491 |
| 2,713,568 | 7/1955 | Fisher et al. | 528/491 X |
| 2,822,356 | 2/1958 | Crane | 528/491 X |
| 3,052,663 | 9/1962 | Bodlaender et al. | 528/499 X |
| 3,620,368 | 11/1971 | Comis et al. | 209/2 |
| 3,622,555 | 11/1971 | Rothenbury et al. | 528/499 X |
| 3,652,752 | 3/1972 | Rosenthal | 528/499 X |
| 3,828,012 | 8/1974 | Arnot et al. | 528/491 |
| 3,830,883 | 8/1974 | Sturt | 528/491 X |
| 3,840,507 | 10/1974 | Bagby et al. | 528/491 |
| 3,847,886 | 11/1974 | Blunt | 528/491 |
| 4,015,064 | 3/1977 | Feldman et al. | 528/491 |
| 4,110,529 | 8/1978 | Stoy | 528/499 X |

FOREIGN PATENT DOCUMENTS

| | | | |
|---|---|---|---|
| 2453909 | 5/1976 | Fed. Rep. of Germany | 528/499 |
| 57-209905 | 12/1982 | Japan | 528/491 |

OTHER PUBLICATIONS

Processes for Major Addition-Type Plastics and Their Monomers, p. 244, Albright, 1974.

*Primary Examiner*—Joseph L. Schofer
*Assistant Examiner*—Fred M. Teskin
*Attorney, Agent, or Firm*—Sherman and Shalloway

[57] ABSTRACT

A method of recovering a vinyl chloride resin, which comprises mixing an aqueous dispersion of a vinyl chloride resin with an organic liquid which is difficultly soluble in water and does not dissolve nor swell the vinyl chloride resin to form a granular aggregate of the vinyl chloride resin, dehydrating the aggregate and drying it, wherein the granular aggregate before dehydration is adjusted to such a particle size that it contains not more than 20% by weight of particles having a particle diameter of not more than 100 microns.

7 Claims, No Drawings

METHOD OF RECOVERING VINYL CHLORIDE RESIN

This invention relates to a method for recovering a vinyl chloride resin, particularly a granular vinyl chloride resin used for paste processing.

Usually, in the paste processing of a vinyl chloride resin, it is the practice to mix a vinyl chloride resin (to be sometimes referred to as a resin) produced for paste processing with a plasticizer and a stabilizer and as required, compounding agents such as a pigment and a filler to form a liquid plastisol, and subject the plastisol to a molding step. Molded articles are obtained by molding the liquid plastisol by such means as casting, coating or dipping and heat-melting and solidifying the molded products. Since the flow characteristics of the plastisol have a very important bearing on its moldability in paste processing, much effort and ingenuity have been used in determining compounding recipes and particularly in designing the quality of the resin. In addition to the flow characteristics of the plastisol, the dispersibility of a powdery compounding agent in a liquid compounding agent is a great factor which affects the properties, above all the appearance and strength, of a molded article. If the powdery compounding agent, for example a resin, remains as a coarse aggregate in the sol, it affects the flowability of the plastisol, and gives rise to various problems such as blockage during transportation of the plastisol, streaking during coating, and the surface roughening, delustering and reduced strength of the molded products. In view of such problems in paste processing, the resin is usually supplied as a fine powder having such a size that it completely passes through a 325-mesh sieve according to JIS. Such a resin is prepared by a process which comprises emulsion-polymerizing or suspension polymerizing vinyl chloride or a monomeric mixture composed mainly of vinyl chloride in the presence of a radical generating polymerization initiator and an emulsifier to obtain an aqueous dispersion of spherical resin particles having a particle diameter of 0.05 to 5 microns, and spray-drying the aqueous dispersion.

The resin obtained by this process contains all of the non-volatile components present in the aqueous dispersion, and these components deteriorate the properties, such as the heat stability, water resistance and transparency, of molded articles. Furthermore, by a usual spray-drying operation, the resin particles in the sprayed aqueous dispersion are dried and captured as a firm aggregate as water is evaporated. To ship them as a product, a pulverizing step is sometimes required. Even when such a treatment is carried out, the aggregated particles frequently cannot be dispersed by simple mixing during the production of a plastisol. Furthermore, since conventional resins are fine powders, they scatter during bagging the product and during bag opening and mixing in the production of a plastisol, and worsen the working environment. In addition, because of the poor flowability of the powder, its automatic measuring and transportation are difficult.

We studied these existing problems of vinyl chloride resins for paste processing, and previously provided a method which comprises mixing an aqueous dispersion of a vinyl chloride resin, particularly a vinyl chloride resin for paste processing, with an organic liquid which is difficultly soluble in water and does not dissolve nor swell the vinyl chloride resin to form a granular aggregate of the vinyl chloride resin, dehydrating it and then drying it thereby to recover the vinyl chloride resin (Japanese Laid-Open Patent Publication No. 209905/1982). It is important in the above method that the granular aggregate of the vinyl chloride resin should be dehydrated as much as possible without deforming and damaging it in order to reduce a load in the subsequent drying step. This dehydration is usually carried out by centrifugal dehydration or vacuum dehydration. But since the granular aggregate frequently becomes a clay-like mass on a separating net or a filter cloth, its separation into a solid and a liquid frequently cannot be performed well and troubles occur.

It is an object of this invention to provide a method of recovering a vinyl chloride resin which is free from such troubles.

We have extensively studied the solid-liquid separation of an aqueous solution containing a granular aggregate of a vinyl chloride resin, and have found that by restricting the content of specific fine particles in the granular aggregate, the granular aggregate can be well dehydrated to give a granular vinyl chloride resin which has a low water content, does not become an agglomerated mass, and is easily dispersible.

Thus, according to this invention, there is provided a method of recovering a vinyl chloride resin, which comprises mixing an aqueous dispersion of a vinyl chloride resin with an organic liquid which is difficultly soluble in water and does not dissolve nor swell the vinyl chloride resin to form a granular aggregate of the vinyl chloride resin, dehydrating the aggregate and drying it, wherein the granular aggregate before dehydration is adjusted to such a particle size that it contains not more than 20% by weight of particles having a particle diameter of not more than 100 microns.

The method of this invention comprises 1) a first step of mixing an aqueous dispersion of the resin with the organic liquid to aggregate the resin through the organic liquid, 2) a second step of dehydrating the mixture obtained in the first step containing the resin aggregate, 3) a third step of drying the dehydrated resin aggregate and 4) a fourth step of recovering the resin removed together with the second step and mixing it with the starting material used in the first step.

The aqueous dispersion of the vinyl chloride resin used in this invention is an aqueous dispersion of a homopolymer of vinyl chloride or a copolymer of a major proportion (usually at least 70% by weight) of vinyl chloride and a minor proportion of an olefinic monomer such as vinyl acetate, vinylidene chloride, ethylene, propylene, butene, acrylonitrile, an acrylic ester, a methacrylic ester or maleic acid which is obtained by usual emulsion polymerization, suspension polymerization or microsuspension polymerization. There is no particular restriction on it so long as it can be used in ordinary processing operations. As required, it may include an extender vinyl chloride resin.

The content of the vinyl chloride resin in the aqueous dispersion is 10 to 70% by weight. Accordingly, the aqueous dispersion of a vinyl chloride resin obtained by polymerization may be used directly, or after partly dehydrating it or adding a suitable amount of water to it. If the content of the vinyl chloride resin is less than 10% by weight, the amount of the waste water becomes too large for the amount of the product, and it is uneconomical. If it exceeds 70% by weight, the viscosity of the mixture of the aqueous dispersion and the organic liquid rises markedly to make the operation difficult.

The organic liquid to be added to the aqueous dispersion of the vinyl chloride resin is difficultly soluble in water and does not dissolve nor swell the resin. There are generally used organic liquids having a melting point of not more than 20° C. and a boiling point above the temperature employed at the time of separating and recovering the vinyl chloride resin in accordance with this invention, preferably above 200° C. If an organic liquid having a boiling point below the temperature used at the time of separation and recovery is used, it volatilizes and an additional facility is required uneconomically for its recovery. If a certain organic liquid does not meet the above requirement but a mixture of it with another organic liquid satisfies the above requirement, it may be used as such a mixture.

There are two reasons for the requirement that the organic liquid should be difficultly water-soluble. Firstly, after mixing with the aqueous dispersion of the vinyl chloride resin, the amount of the organic liquid entrained in water to be separated is decreased so as to prevent the loss of the organic liquid and alleviate the operation of treating the waste water. Secondly, to aggregate the resin particles dispersed in water through the organic liquid, it is necessary that the organic liquid should exist between the resin particles and water as a liquid phase having an interface.

If the organic liquid dissolves or swells the resin, the resin particles are inconveniently deformed and degenerated. Furthermore, since the organic liquid used in this invention mostly remains in the product resin, the use of those organic liquids which may adversely affect the operability and processability during processing and the quality of the molded products should be avoided. In view of the foregoing, it is most natural and rational to use liquid compounding agents which are used in normal processing.

Examples of the organic liquid used in this invention are shown below.

(1) Alkyl phthalate-type plasticizers such as dioctyl phthalate, dinonyl phthalate, butyl lauryl phthalate and methyl oleyl phthalate.

(2) Aromatic carboxylate-type plasticizers such as trioctyl trimellitate and diethylene glycol dibenzoate.

(3) Aliphatic dibasic acid ester-type plasticizers such as dioctyl adipate, dibutyl sebacate and dioctyl tetrahydrophthalate.

(4) Phosphate-type plasticizers such as trioctyl phosphate and trichloroethyl phosphate.

(5) Aliphatic glycol ester-type plasticizers such as diethylene glycol dicaprylate and 1,4-butylene glycol di-2-ethylhexanoate.

(6) Polyester-type plasticizer (7) Fatty acid ester-type secondary plasticizers such as butyl oleate, methyl acetyllicinolate and 2,2,4-trimethyl-1,3-pentanediol diisobutyrate; epoxy-type secondary plasticizers such as epoxidized soybean oil and octyl epoxystearate; chlorinated paraffin-type secondary plasticizers such as chlorinated fatty acid methyl esters and chlorinated paraffins; and aliphatic dibasic acid ester-type secondary plasticizers such as dioctyl succinate.

(8) Petroleum diluents such as mineral spirit and mineral terpene, and long-chain alkylbenzene-type diluents such as dodecylbenzene.

(9) Liquid lubricants such as higher alcohols, liquid paraffin, and higher fatty acid alkyl esters.

The amount of the organic liquid used is usually 0.5 to 30 parts by weight, preferably 1 to 15 parts by weight, per 100 parts by weight of the resin in the aqueous dispersion. If it is less than 0.5 part by weight, the resin particles cannot get together sufficiently through the organic liquid. If it exceeds 30 parts by weight, it is very likely that the product is obtained as a sol-like aggregate. Even if it is obtained as a granular aggregate, its high content of the organic liquid makes it difficult to remove the remaining liquid in the subsequent drying step, and this might lead to a reduction in productivity.

In mixing the aqueous dispersion of the resin and the organic liquid, the mixing time may be properly determined so as not to induce excessive heat generation. Usually, it is several tens of second to several tens of minute. Mixing may be performed by a mixing device which satisfies the required conditions. Generally, it is possible to use a high-speed rotating continuous mixer, a multiblade-type continuous mixing tank, a batchwise stirring tank-type mixer, a vessel rotating-type mixer and a static mixer of the liquid dividing type. Mixing may also be carried out by ultrasonic irradiation.

Mixing of the organic liquid with the aqueous dispersion of the resin is carried out at a temperature which is within 20° to 70° C. and at which the organic liquid used does not dissolve or swell the resin. As the temperature gets higher, the speed of swelling of the resin by the organic liquid increases. Preferably, therefore, the temperature should be not more than 50° C. If it exceeds 70° C., the absorption of the organic liquid into the resin becomes rapid. Moreover, the resin particles are softened and coalesced, and the final product is likely to be no longer adaptable to processing.

In dehydrating the granular aggregate of the resin obtained through the organic liquid, it is necessary to adjust the content of particles having a size of not more than 100 microns in the granular aggregate to not more than 20% by weight, preferably not more than 10% by weight. If this content exceeds 20% by weight, the granular material after dehydration tends to become clay-like. The adjustment of the content of fine particles having a size of not more than 100 microns is effected by properly selecting the operating conditions in the first step, namely the resin concentration of the aqueous dispersion, the concentration of the organic liquid, the mixing conditions, etc. or by classifying the resin particles by a sieve prior to dehydration. The dehydration may be carried out by known methods according to the form of the captured resin. It can be achieved with high efficiency. To prevent softening and coalescing of the resin particles, the temperature should be adjusted within the range of 20° to 70° C.

The resin particles separated in the dehydrating step are then sent to the drying step wherein the adhering water is removed. In this drying step, a wide range of known drying devices can be used. It is necessary to set such conditions under which the strength of aggregation and coalescing of the resin does not impair the dispersibility of the resin during processing. Specifically, the temperature of the resin to be dried should be adjusted to not more than 70° C., preferably not more than 50° C.

The resulting dry powder has good flowability and little scatterability. In addition, when it is formed into a plastisol in a customary manner, its viscosity characteristics are excellent. A molded product prepared from it in a customary manner has excellent heat stability.

The following Examples illustrate the method of this invention specifically.

EXAMPLE 1

3,500 g of an aqueous dispersion (solids content 30% by weight) of a vinyl chloride resin for paste processing and 80 g of di-2-ethylhexyl phthalate were put in a cylinderical stainless steel mixer having an inside diameter of 10 cm and an inner capacity of 3.8 liters and including many stirring vanes with a diameter of 9 cm, and mixed for 20 minutes at 1000 rpm to obtain an aqueous dispersion of a spherical resin composition.

The dispersion was filtered through a sieve having an opening size of 80 microns, and classified with gentle water spraying to obtain wet granules on the sieve. A part of the wet granules was taken, and classified by a sieve having an opening size of 100 microns with gentle water spraying. The proportion of particles having a size of not more than 100 microns in the granular product was found to be 7% by weight.

Seven hundred parts by weight of the wet granular material on the 80 micron sieve was put in a basket-type centrifugal dehydrator, and dehydrated centrifugally for 5 minutes by a centrifugal force of 200 G to obtain 520 g of granules having a water content of 27%. The granules were spread on a wire gauze having an opening size of 100 microns and dried by passing air at 40° C. to a water content of less than 1% by weight. The resulting dry granules had an average particle diameter of 360 microns, an angle of repose of 41 degrees and a degree of compression of 17%, and exhibited good flowability. When the product was formed into a plastisol, its viscosity characteristics were excellent. After molding, the product had excellent heat stability.

COMPARATIVE EXAMPLE 1

An aqueous dispersion of a spherical composition obtained in the same way as in Example 1 was filtered and classified on a sieve having an opening size of 40 microns to obtain wet granules on the sieve. A portion of the wet particles was taken, and by the same method as in Example 1, the proportion of particles having a size of not more than 100 microns in the granules was determined and found to be 23% by weight.

Seven hundred grams of the granular composition was centrifugally dehydrated at 200 G for 5 minutes. The composition became a clay-like mass. The centrifugation time was extended by 10 minutes, but there was no change in appearance. The clay-like mass had a water content of 34%. When the mass was broken to small blocks and dried in air at 40° C., most of them remained small blocks, and spherical particles could not be obtained.

EXAMPLE 2

Eight hundred grams of an aqueous dispersion (solids content 35% by weight) of a vinyl chloride resin for paste processing and 35 g of 2,2,4-trimethyl-1,3-pentanediol diisobutyrate were put in a 1-liter stainless steel mixer having an inside diameter of 16 cm and including stirring blades with a diameter of 12 cm, and mixed for 20 minutes at 800 rpm to obtain an aqueous dispersion of a spherical resin composition.

The dispersion was filtered through a sieve having an opening size of 80 microns, and with gentle water spraying, classified to obtain wet granules on the sieve. A portion of the wet granules was taken, and the proportion of particles having a size of not more than 100 microns in the granules was determined and found to be 10% by weight.

Three hundred grams of the spherical resin composition on the 80-micron sieve was put in a dropping funnel using a filter cloth having an air permeability of 80 cc/sec.cm$^2$, and vacuum dehydrated for 3 minutes by setting the initial pressure at 400 mmHg to obtain 220 g of granules having a water content of 28%. Then, the granules were put in a fluidized bed-type dryer, and dried to a water content of less than 1% by weight with air at 40° C. After drying, the granules had an average particle diameter of 420 microns, an angle of repose of 40 degrees and a degree of compression of 21%, and as in Example 1, showed good flowability. The viscosity characteristics of a plastisol prepared from the granules and the heat stability of a molded product from the granules were both excellent.

COMPARATIVE EXAMPLE 2

An aqueous dispersion of a spherical resin composition obtained by the same method as in Example 2 was put in the same dropping funnel as in Example 2 without classifying it by a sieve so as to dehydrate it under vacuum. The spherical resin composition aggregated in the form of a cake, and after sucking for 15 minutes, its water content was 42%. This composition did not at all flow, and was unsuitable for drying on a fluidized layer. It was dried with air at 40° C. on a wire gauze having an opening size of 100 microns. But after drying, it mostly remained lumpy, and could not be obtained as granules. The proportion of particles having a size of not more than 100 microns in the granules contained in the aqueous dispersion was 32% by weight.

What is claimed is:

1. A method of recovering a vinyl chloride resin in the form of granules having good flow characteristics and suitable for use in paste processing, said method comprising the steps of mixing an aqueous dispersion containing 10–70% by weight of a vinyl chloride resin at a temperature of 20° to 70° C. with from 0.5 to 30 parts by weight, per 100 parts by weight of the vinyl chloride resin in the aqueous dispersion, of an organic liquid which is difficultly soluble in water and does not dissolve nor swell the vinyl chloride resin to form a granular aggregate of the vinyl chloride resin, classifying the granular aggregate by passing the granular aggregate through a sieve to thereby adjust the particle size of the granular aggregate to contain not more than 20% by weight of particles having a particle diameter of not more than 100 microns, and dehydrating and drying the particle size-adjusted granular aggregate to thereby recover said vinyl chloride resin as an easily dispersible, non-agglomerating mass of granules having good flowability.

2. The method of claim 1 wherein the particle size of the granular aggregate is adjusted to contain not more than 10% by weight of particles having a particle diameter of not more than 100 microns.

3. The method of claim 1 wherein the organic liquid has a melting point of not more than 20° C. and a boiling point above about 200° C.

4. The method of claim 1 wherein the organic liquid is selected from the group consisting of alkyl phthalate plasticizers, aromatic carboxylate plasticizers, aliphatic dibasic acid ester plasticizers, phosphate plasticizers, aliphatic glycol ester plasticizers, polyester plasticizers, fatty acid ester secondary plasticizers, epoxy secondary plasticizers, chlorinated paraffin secondary plasticizers, aliphatic dibasic acid ester secondary plasticizers, petroleum diluents, long-chain alkyl benzene diluents and liquid lubricants.

5. The method of claim 1 wherein the organic liquid is an alkyl phthalate plasticizer.

6. The method of claim 5 wherein the alkyl phthalate plasticizer is dioctyl phthalate, dinonyl phthalate, butyl lauryl phthalate, methyl oleyl phthalate, or di-2-ethylhexylphthalate.

7. The method of claim 1 wherein the aqueous dispersion is mixed with 1 to 15 parts by weight, per 100 parts by weight of the vinyl chloride resin in the aqueous dispersion, of the organic liquid.

* * * * *